(12) United States Patent
Minchau et al.

(10) Patent No.: US 10,358,225 B2
(45) Date of Patent: Jul. 23, 2019

(54) MECHANISM AND METHOD FOR ARMING/DISARMING THE ACTUATION OF AN EMERGENCY SLIDE

(75) Inventors: Ken Minchau, St-Lazare (CA); John Savidge, Senneville (CA); Eric Munger, San Diego, CA (US)

(73) Assignee: BOMBARDIER INC., Dorval, Quebec (CA)

( * ) Notice: Subject to any disclaimer, the term of this patent is extended or adjusted under 35 U.S.C. 154(b) by 856 days.

(21) Appl. No.: 14/382,858

(22) PCT Filed: Mar. 9, 2012

(86) PCT No.: PCT/IB2012/000457
§ 371 (c)(1),
(2), (4) Date: Sep. 4, 2014

(87) PCT Pub. No.: WO2013/132282
PCT Pub. Date: Sep. 12, 2013

(65) Prior Publication Data
US 2015/0034769 A1    Feb. 5, 2015

(51) Int. Cl.
*B64D 25/14* (2006.01)
*B64C 1/14* (2006.01)

(52) U.S. Cl.
CPC ............ *B64D 25/14* (2013.01); *B64C 1/1423* (2013.01)

(58) Field of Classification Search
CPC .............................. B64D 25/14; B64C 1/1423
(Continued)

(56) References Cited

U.S. PATENT DOCUMENTS 3,634,914 A * 1/1972 Schroedter ............ B64D 25/14
16/325
3,852,854 A * 12/1974 Sigrud .................... B64D 25/14
182/48
(Continued)

FOREIGN PATENT DOCUMENTS

| EP | 0743246 A1 | 11/1996 |
|---|---|---|
| EP | 0743246 B2 | 9/2010 |
| JP | 3157297 A | 5/1991 |

OTHER PUBLICATIONS

International Search Report and Written Opinion dated Dec. 19, 2012, for International Patent Application No. PCT/IB2012/000457.
(Continued)

*Primary Examiner* — Marc Burgess
(74) *Attorney, Agent, or Firm* — Karceski IP Law, PLLC

(57) ABSTRACT

A mechanism for arming and disarming an actuation of an emergency slide retained on a door of an aircraft and selectively configurable between an armed configuration and a disarmed configuration. The mechanism includes at least one transport hook extending radially from the rotating shaft and rotatable therewith about the longitudinal axis of the shaft. The transport hook has interconnected top and bottom portions defining a carrying slot therebetween. In the disarmed configuration, the transport hook receives the girt bar in the carrying slot, such that the transport hook carries the girt bar upon opening of the door. In the armed configuration, the transport hook is pivoted away from the girt bar and oriented such as to move over the girt bar without contact therewith upon opening of the door.

13 Claims, 8 Drawing Sheets

(58) Field of Classification Search
USPC .............................................. 244/137.2, 905
See application file for complete search history.

(56) References Cited

U.S. PATENT DOCUMENTS

| | | | |
|---|---|---|---|
| 4,106,726 A | 8/1978 | Bergman et al. | |
| 4,106,729 A * | 8/1978 | Bergman | B64D 25/14 |
| | | | 193/25 B |
| 4,125,235 A * | 11/1978 | Fitzgerald | B64C 1/143 |
| | | | 244/129.5 |
| 4,441,582 A * | 4/1984 | Ward, Jr. | B64D 25/14 |
| | | | 182/48 |
| 4,715,562 A * | 12/1987 | Bokalot | B64D 25/14 |
| | | | 244/137.2 |
| 5,106,036 A * | 4/1992 | Sepstrup | B64D 25/14 |
| | | | 244/129.1 |
| 5,400,985 A * | 3/1995 | Banks | B64D 25/14 |
| | | | 182/48 |
| 5,636,814 A | 6/1997 | Rollert | |
| 5,738,303 A * | 4/1998 | Hamatani | B64D 25/14 |
| | | | 244/129.1 |
| 8,061,658 B2 * | 11/2011 | Bullesbach | B64D 25/14 |
| | | | 244/137.2 |
| 2009/0020648 A1 * | 1/2009 | Bullesbach | B64D 25/14 |
| | | | 244/137.2 |

OTHER PUBLICATIONS

Boeing 737—100/200/300/400/500 Series, Airplane Rescue and Firefighting Information dated Oct. 31, 2007.
Chinese Office Action dated Jul. 16, 2015, for Chinese Patent Application No. 201280071264.5.
Canadian Office Action dated Mar. 6, 2018, for Canadian Patent Application No. 2,866,017.

* cited by examiner

MECHANISM AND METHOD FOR ARMING/DISARMING THE ACTUATION OF AN EMERGENCY SLIDE

CROSS-REFERENCE TO RELATED APPLICATION(S)

This is a National Stage Entry into the United States Patent and Trademark Office from International PCT Patent Application No PCT/IB2012/000457, having an international filing date of Mar. 9, 2012, the entire contents of which is incorporated herein by reference.

FIELD OF THE APPLICATION

The present application relates to aircraft emergency evacuation systems, more particularly to a mechanism for arming and disarming the actuation of an emergency evacuation slide upon opening of a door.

BACKGROUND OF THE ART

Passenger airplanes often include emergency inflatable slides which are designed to automatically inflate upon opening of the doors when armed. The slide is contained in the door and when in the armed configuration, the base of the slide is anchored to the fuselage: opening of the door thus pulls the slide open which is then inflated with pressurized gas. In the disarmed configuration, the base of the slide is anchored to the door and follows the door upon its opening.

U.S. Pat. No. 5,738,303 shows a mechanism where a fixed jaw cooperates with a movable jaw of a linkage member. The movable jaw is pivotally attached between two flanges of a door base plate and slidingly and pivotally received in a slot of a bell crank, with the bell crank being rotated by a torque tube. The two jaws together grasp the girt bar when the mechanism is in the disarmed configuration. The mechanism is relatively complex, with movement of the jaw being determined by the interaction of multiple members.

The girt bar is usually retained adjacent the floor structure near the door opening, which is a zone prone to moisture and as such ice build up at low temperatures. Such ice build up may interfere with the operation of the mechanism between the disarmed and armed configurations and/or the movement of the girt bar in the disarmed configuration upon opening of the door.

SUMMARY OF THE APPLICATION

It is therefore an aim of the present disclosure to provide an improved mechanism for arming and disarming the actuation of an emergency slide.

Therefore, in accordance with the present invention, there is provided a mechanism for arming and disarming an actuation of an emergency slide retained on a door of an aircraft, the mechanism being selectively configurable between an armed configuration and a disarmed configuration and comprising: a girt bar attached to one end of the slide; a floor fitting receiving the girt bar and including a movable portion movable between different positions corresponding to the armed and disarmed configurations, the movable portion capturing the girt bar to prevent disengagement from the floor fitting when the mechanism is in the armed configuration and defining a free path allowing the girt bar to be removed therethrough when the mechanism is in the disarmed configuration; a shaft attached to the door and rotatable about a longitudinal axis of the shaft, the shaft being rotatable between different orientations corresponding to the armed and disarmed configurations; and at least one transport hook extending radially from the shaft and rotatable therewith about the longitudinal axis of the shaft, the transport hook having interconnected top and bottom portions defining a carrying slot therebetween, the transport hook having the bottom portion extending below the girt bar and the top portion extending above the girt bar with the girt bar being received in the carrying slot when the mechanism is in the disarmed configuration such that the transport hook carries the girt bar upon opening of the door, the transport hook being pivoted away from the girt bar when the mechanism is in the armed configuration and oriented such as to move over the girt bar without contact therewith upon opening of the door.

Also in accordance with the present invention, there is provided a method of disarming an actuation of an emergency slide retained on an aircraft door, the method comprising: rotating a shaft about a longitudinal axis thereof, the shaft having at least one transport hook extending directly radially therefrom, the shaft being retained on the door; engaging a girt bar attached to one end of the slide in a carrying slot of each transport hook; and opening a free path in a fitting receiving the girt bar, the free path being defined in a direction corresponding to a motion of the at least one transport hook upon opening of the door.

BRIEF DESCRIPTION OF DRAWINGS

For a better understanding of the present invention, as well as other aspects and further features thereof, reference is made to the following description which is to be used in conjunction with the accompanying drawings, where.

DESCRIPTION OF PREFERRED EMBODIMENTS

Figure 1:
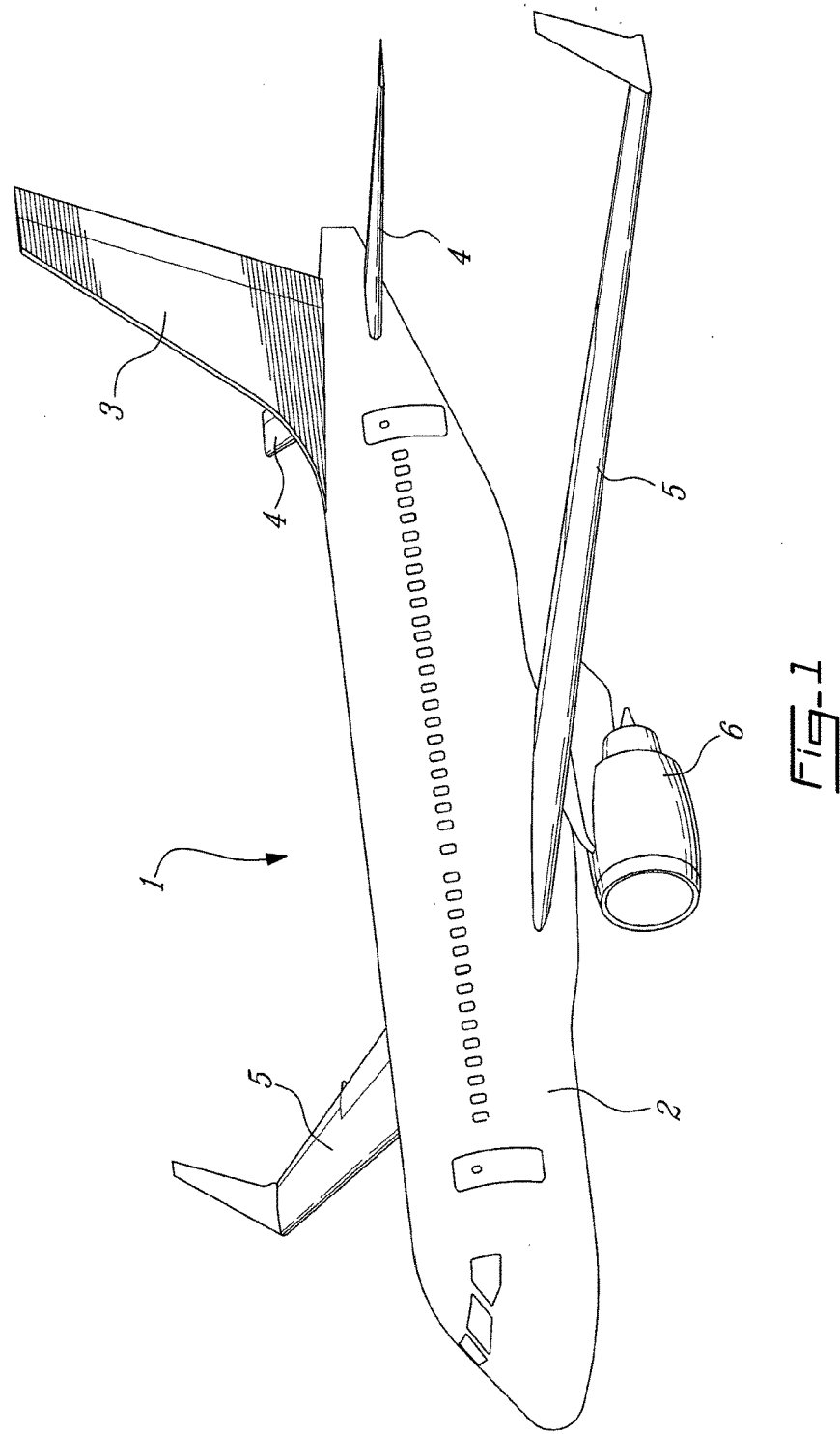
FIG. 1 is a schematic tridimensional view of an exemplary aircraft on which the present mechanism can be used.

Referring to the drawings and more particularly to FIG. 1, an aircraft is shown at 1, and is generally described to illustrate some components for reference purposes in the present disclosure. The aircraft 1 has a fuselage 2 having a fore end at which a cockpit is located, and an aft end supporting a tail assembly, with the cabin generally located between the cockpit and the tail assembly. The tail assembly comprises a vertical stabilizer 3 with a rudder, and horizontal stabilizers 4 with elevators. The tail assembly has a fuselage-mounted tail, but other configurations may also be used for the aircraft 1, such as cruciform, T-tail, etc. Wings 5 project laterally from the fuselage. The aircraft 1 has engines 6 supported by the wings 5, although the engines 6 could also be mounted to the fuselage 2. The aircraft 1 is shown as a jet-engine aircraft, but may also be a propeller aircraft.

Figure 2:
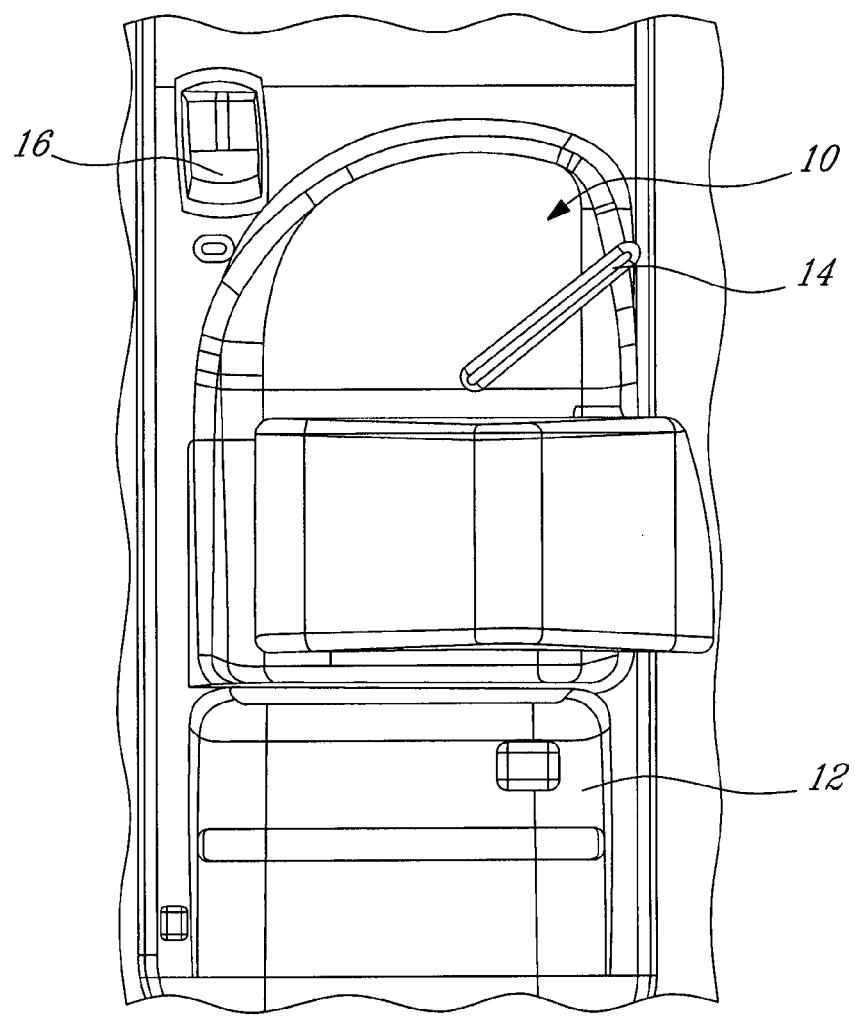
FIG. 2 is a schematic inner view of an emergency door of an aircraft such as shown in FIG. 1.

Referring to FIG. 2, the inner side of a door of the aircraft 1 is shown. An emergency slide is contained in a pack 12 attached to the door 10. An inner door handle 14 is provided for unlatching and opening the door 10, as well as a mode select handle 16 for selection between arming and disarming actuation of the emergency slide.

Figure 3:
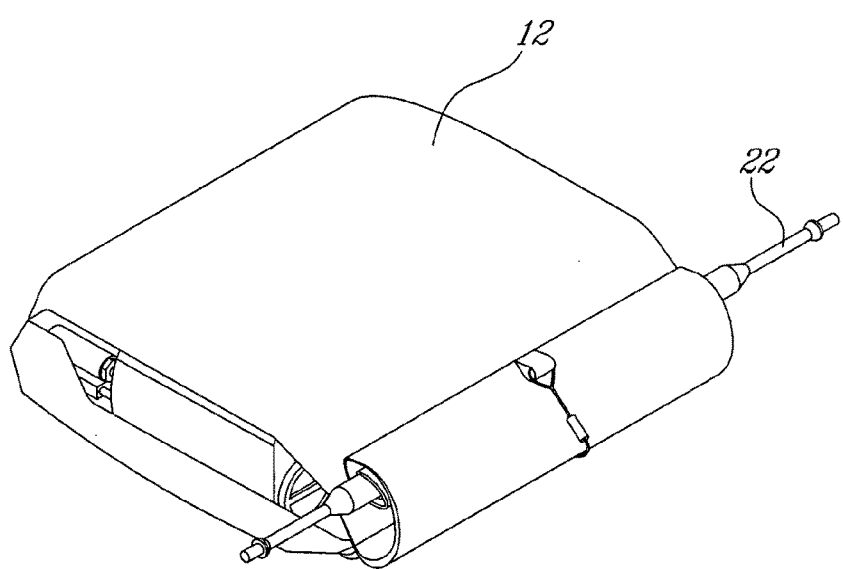
FIG. 3 is a schematic tridimensional view of an exemplary emergency slide pack and girt bar which can be used with the door of FIG. 2.
Figure 4:
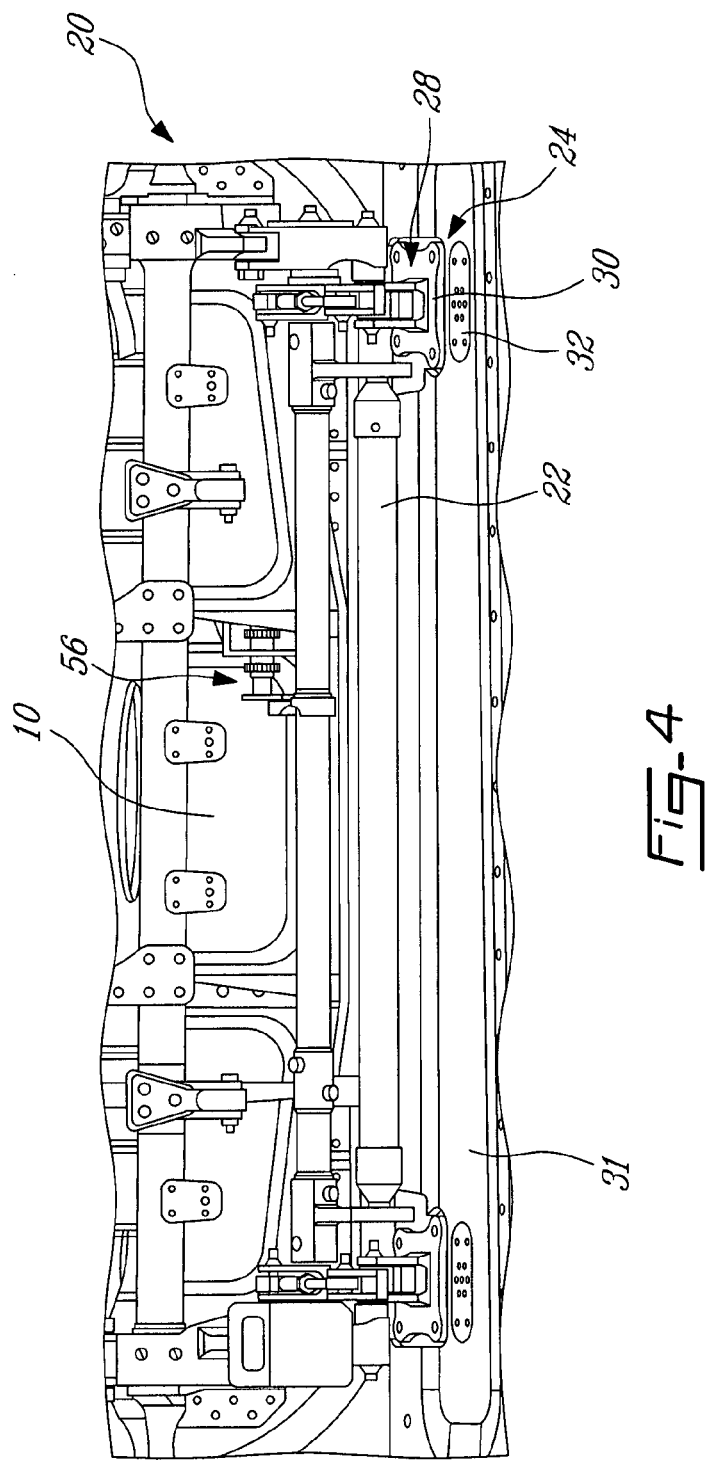
FIG. 4 is a schematic inner view of a mechanism for arming and disarming the actuation of an emergency slide such as that shown in FIG. 3.

Referring to FIG. 4, the mechanism 20 actuated by the mode select handle 16 for arming and disarming of the actuation of the emergency slide is shown. Although not shown, the mechanism 20 is also actuated by an outer door handle of the door 10 if armed, such as to be disarmed when the door 10 is open from the outside. The mechanism 20 generally includes a girt bar 22 attached to one end of the slide (see FIG. 3) and received in a floor fitting 24. When armed, upon opening of the door 10, the girt bar 22 is retained in the floor fitting 24 and the slide is deployed as the pack 12 is moved away from the girt bar 22 and the end of the slide engaged thereto. When disarmed, upon opening of the door 10, the girt bar 22 follows the door 10 and the slide remains in the pack 12.

The floor fitting 24 thus captures the girt bar 22 (see FIGS. 5-7) when the mechanism 20 is in the armed configuration, and defines a free path 26 allowing the girt bar 22 to be removed therethrough (see FIG. 8) when the mechanism is in the disarmed configuration. In the embodiment shown, the door 10 opens through an initial upward motion, and as such the free path 26 is defined along a top portion of the girt bar 22.

Referring to FIG. 4, the floor fitting 24 includes a fixed support 28 on each end of the girt bar 22. Each support includes a bottom plate 30 attached to the floor structure 31 of the fuselage adjacent the door opening. In a particular embodiment, the bottom plate 30 is connected to the fuselage such as to be adjustable in position and in height. A drain 32 may be provided adjacent each bottom plate 30 for evacuation of collected fluids and reduction of icing risks.

Figure 5:
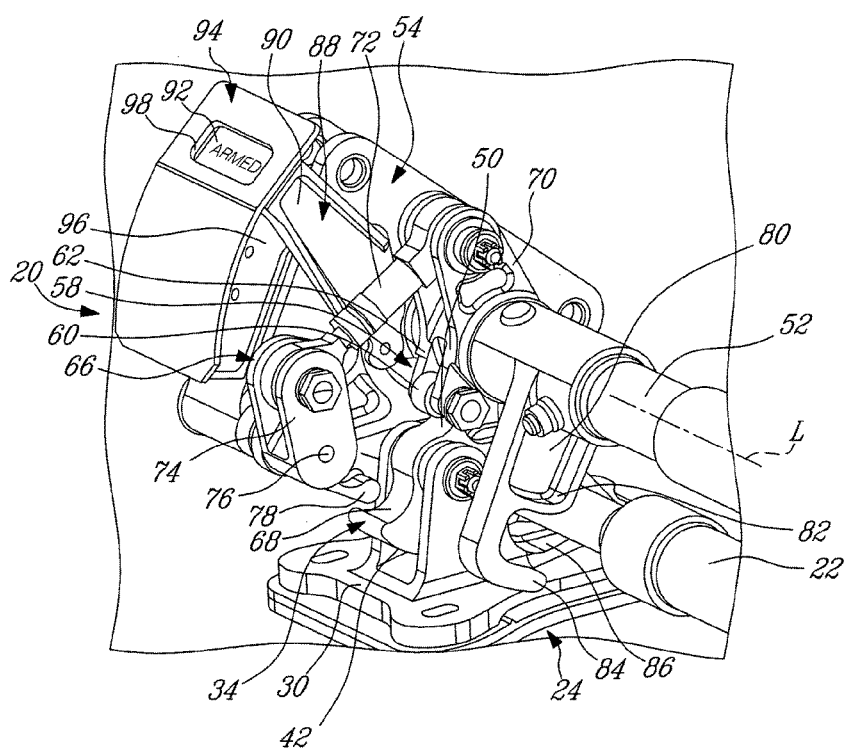
FIG. 5 is a schematic tridimensional view of part of the mechanism of FIG. 4 in an armed configuration.

Referring to FIG. 5, the floor fitting 24 includes a movable portion moving between different positions corresponding to the armed and disarmed configurations of the mechanism 20. In the embodiment shown, the movable portion is a pivotable pawl 34 located adjacent each end of the girt bar 22. The pawl 34 captures the girt bar 22 in the armed configuration and is pivoted so as to free the girt bar 22 in the disarmed configuration.

Figure 6:
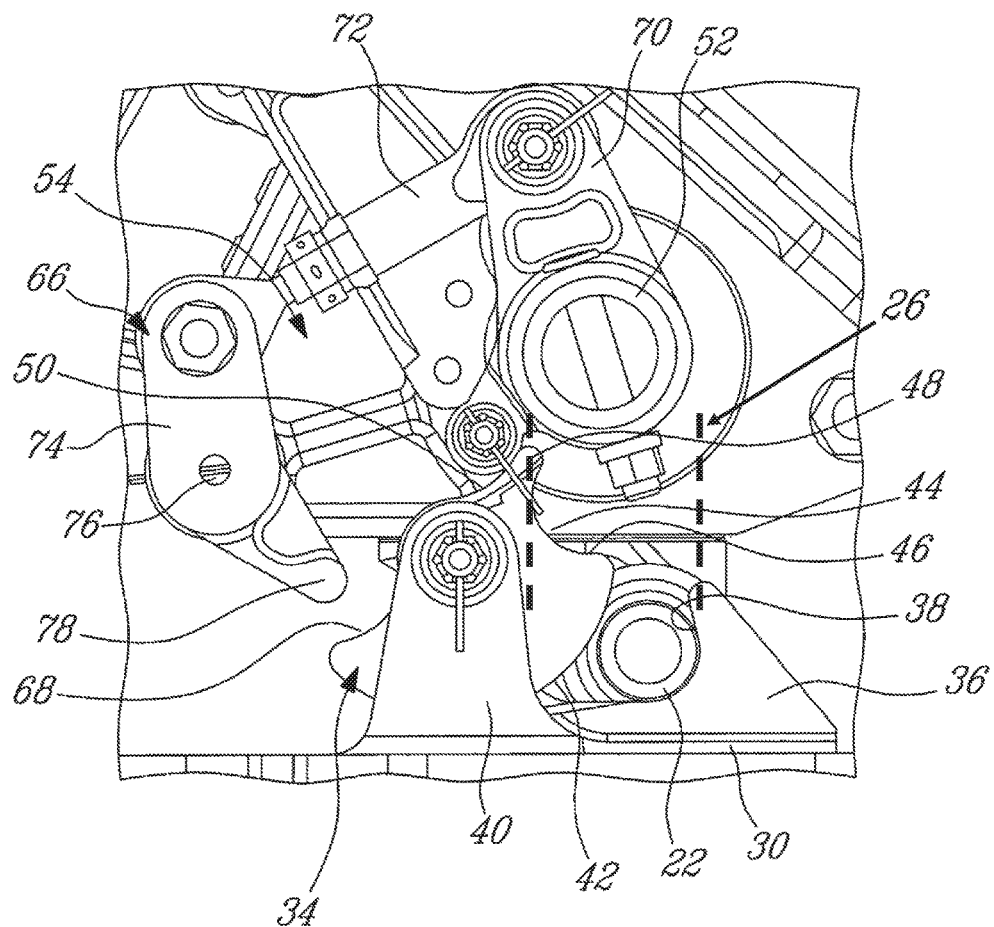
FIG. 6 is a schematic side view of part of the mechanism of FIG. 4 in the armed configuration.
Figure 7:
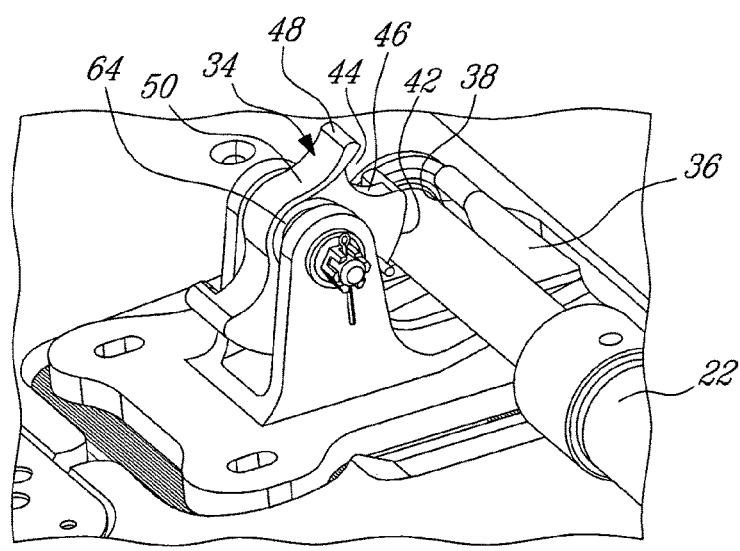
FIG. 7 is a schematic tridimensional view of a portion of the mechanism of FIG. 4 in the armed configuration.

As can be seen in FIGS. 6-7, each bottom plate 30 of the floor fitting 24 has a fixed curved bracket 36 extending therefrom on the door side of the girt bar 22, and defining a concave surface 38 shaped to contact part of a perimeter of the girt bar 22. The pawl 34 is pivotally retained by a pivot between two spaced apart fixed support members 40 extending from the bottom plate 30, on the side of the girt bar 22 opposite the door 10. In the embodiment shown, the pawl 34 includes a continuous arcuate bottom surface 42, defined as a convex curve and spaced apart from the bottom plate 30. The bottom surface 42 is sized and positioned such as to contact the girt bar 22 in the armed configuration (shown in FIGS. 6-7). The girt bar 22 is thus effectively sandwiched between the bottom surface 42 of the pawl 34 and the concave surface 38 of the bracket 36 and as such is retained in place.

The pawl 34 also includes a notch 44 formed by a concave surface 46 located upwardly from the portion of the bottom surface 42 which is in contact with the girt bar 22 when in the armed configuration. The notch 44 is sized to allow a pivoting motion toward the girt bar 22 from the armed configuration (clockwise as viewed from FIG. 6) without interference from the girt bar 22; in the disarmed configuration, the concave surface 46 defining the notch 44 surrounds the girt bar 22 while leaving a free path between the pawl 34 and the curved bracket 36 along the top of the girt bar 22, for the girt bar 22 to be removed therethrough. The pawl 34 further includes a top finger 48 defining a concave disarming contact surface 50, the purpose of which will be further detailed below. The underside of the finger 48 is defined by the concave surface 46 of the notch 44. The finger 48 is sized such as not to interfere with the free path of the girt bar 22 in the disarmed configuration.

Referring back to FIG. 5, the mechanism 20 further includes a torque shaft 52 which is pivotally retained by a door fitting 54 to be rotatable about its longitudinal axis L, and an actuating mechanism 56 (see FIG. 4) connected to the shaft 52 to rotate it between different orientations corresponding to the armed and disarmed configurations of the mechanism 20. The actuating mechanism 56 may for example include a series of push/pull rods which are actuated by the mode select handle 16.

The shaft 52 and floor fitting 24 cooperate such that their movement between the armed and disarmed configurations are coordinated. In the embodiment shown, this is accomplished by an engagement member 58 extending from the shaft 52 and engaging the pawl 34. The engagement member 58 includes a roller 60 supported between two spaced apart arms 62 which extend radially from the shaft 52. The roller 60 contacts the disarming contact surface 50 of the pawl finger 48. The roller 60 presses on the contact surface 50 and moves thereon as the shaft 52 is rotated from the armed configuration to the disarmed configuration, thus actuating the rotation of the pawl 34 as the shaft 52 rotates.

In a particular embodiment, the pawl 34 is biased toward the armed configuration, for example by a torsion spring 64 (see FIG. 7). Referring to FIGS. 5-6, the mechanism 20 also includes an ice breaking assembly 66 connected to the shaft 52 and movable therewith. The pawl 34 includes a top notch formed by a concave arming contact surface 68 interconnecting the bottom surface 42 and the disarming contact surface 50. The two contact surfaces 50, 68 are located on opposite sides of the pawl pivot. The ice breaking assembly 66 includes an element which moves in proximity of the arming contact surface 68 but without making contact therewith under normal action of the spring 64. In case of ice obstruction, if the spring force is not sufficient to move the pawl 34 back to the armed configuration, the ice breaking assembly 66 makes contact with the arming contact surface 68 and pushes on the pawl 34 upon rotation of the shaft 52 toward the armed configuration, forcing the pawl 34 to return to the armed configuration and liberating it from the ice obstruction.

In the embodiment shown, the ice breaking assembly 66 includes a first member 70 extending radially from the shaft 52 and rigidly connected thereto and a second member 72 having one end pivotally connected to the first member 70 and the other end pivotally connected to a third member 74. The third member 74 is also pivotally connected to the door fitting 54 with a pivot connection 76 located opposite of the second member 72. A finger 78 rigidly extends from the third member 74 adjacent the pivot connection 76 with the door fitting 54 and defines the portion of the ice breaking assembly 66 moving in proximity of the arming contact surface 68 of the pawl 34. The finger 78 thus follows the movement of the pawl 34 and makes contact therewith if the pawl 34 does not return to the armed configuration through the action of the spring 64.

Referring back to FIGS. 5 and 8, the mechanism 20 further includes at least one transport hook 80, for example one adjacent each end of the girt bar 22, which extends directly radially from the shaft 52 separately and spaced apart from the engagement member 58 and from the ice breaking assembly 66. The transport hook 80 is rigidly connected to the shaft 52 such as to be rotatable therewith about the longitudinal axis L. The hook 80 includes interconnected top and bottom portions 82, 84 which define a carrying slot 86 therebetween. In the armed configuration shown in FIG. 5, the transport hook 80 is pivoted away from the girt bar 22 and oriented such as to move over the girt bar 22 without contact therewith upon opening of the door 10. In the disarmed configuration shown in FIG. 8, the bottom portion 84 of the transport hook 80 extends below the girt bar 22 and the top portion 82 thereof extends above the girt bar 22, such that girt bar 22 is received in the carrying slot 86. The bottom and top portions 82, 84 of the transport hook 80 may protrude beyond the girt bar 22 to help secure the position of the girt bar 22 within the carrying slot 86; in other words, the depth of the slot 86 may be greater than the diameter of the portion of the girt bar 22 received therein. The transport hook 80 thus carries the girt bar 22 upon opening of the door, with the girt bar 22 sliding on the curved bracket 36 and leaving the floor fitting 24 through the free path 26 defined between the curved bracket 36 and the pawl 34.

In a particular embodiment, in the disarmed configuration, the transport hook 80 rotates until the girt bar 22 within the carrying slot 86 is in contact or almost in contact with the hook 80, without the hook 80 moving the girt bar 22. As such, the girt bar 22 remains in the same position and orientation between the armed and disarmed configurations. Alternately, the transport hook 80 may be oriented such that in the disarmed configuration the hook 80 lifts the girt bar 22 to a position partially out of the floor fitting 24.

Figure 8:
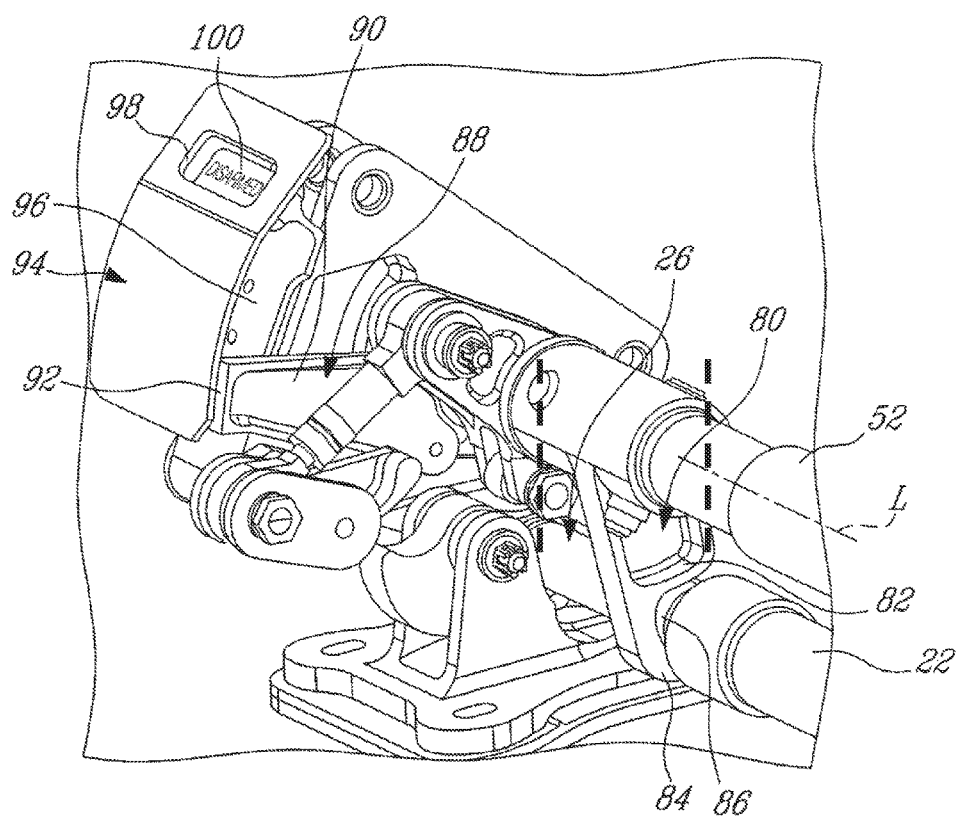
FIG. 8 is a schematic tridimensional view of part of the mechanism of FIG. 4 in a disarmed configuration.

Still referring to FIGS. 5 and 8, in a particular embodiment, the mechanism further includes a position indicator 88 connected to the shaft 52 and pivotable therewith. In the embodiment shown, a single indicator 88 is provided, adjacent one of the ends of the girt bar 22. The indicator 88 includes an arm 90 rigidly extending from the shaft 52 and rotating therewith, and an indicator plate 92 extending from the arm 90, for example perpendicularly or substantially perpendicularly thereto. A fixed casing 94 is defined adjacent the indicator 88, for example as part of the door fitting 54. The casing 94 has an open side 96 facing the shaft 52 and adjacent the indicator arm 90, through which the indicator plate 92 extends to be received in the casing 94. The cabin side surface of the casing 94 has an opening 98 defined therethrough, sized and positioned such that the indicator plate 92 is visible through the opening 98 in only one of the armed and disarmed configurations of the mechanism 20. In the embodiment shown, the indicator plate 92 is visible through the opening 98 in the armed configuration only. The indicator plate 92 includes an adequate indication of the mode of the mechanism 20, for example the word "Armed" and/or a particular colour, e.g. red.

In addition, in the embodiment shown, a fixed plate 100 (see FIG. 8) is supported within the casing 94 in alignment with the opening 98 but located such as to be covered by the indicator plate 92 when the indicator plate 92 is aligned with the opening 98. As such, when the indicator plate 92 is out of alignment with the opening 98 and hidden in the casing 94, which in the embodiment shown corresponds to the disarmed configuration, the fixed plate 100 becomes visible through the opening 98. The fixed plate 100 includes an adequate indication of the mode of the mechanism 20, for example the word "Disarmed" and/or a particular color different from that of the indicator plate 92, e.g. green.

The mechanism 20 thus includes relatively few moving parts involved in the change between the armed and disarmed configurations, which may help minimize the risks of failures, e.g. mechanical failures, movement prevented due to icing conditions, etc. In the case where the girt bar 22 does not change position or orientation between the armed and disarmed configurations of the mechanism 20, the risks of icing interfering with the operation of the mechanism 20 may be reduced.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A mechanism for arming and disarming an actuation of an emergency slide retained on a door of an aircraft, the mechanism selectively configurable between an armed configuration and a disarmed configuration, comprising:
    a girt bar attached to one end of the slide;
    a floor fitting receiving the girt bar and including a movable portion movable between a first position and a second position corresponding to the armed and disarmed configurations, the movable portion capturing the girt bar to prevent disengagement from the floor fitting when the mechanism is in the armed configuration and defining a free path allowing the girt bar to be removable through the free path when the mechanism is in the disarmed configuration;
    a shaft attached to the door, rotatable about a longitudinal axis of the shaft and rotatable between a first orientation and a second orientation corresponding to the armed and disarmed configurations; and
    at least one transport hook rigidly connected to the shaft, extending radially from the shaft and rotatable with the shaft about the longitudinal axis of the shaft, the transport hook having interconnected top and bottom portions defining a carrying slot between the top and bottom portions, wherein the transport hook has the bottom portion extending below the girt bar and the top portion extending above the girt bar with the girt bar received in the carrying slot when the mechanism is in the disarmed configuration such that the transport hook carries the girt bar upon opening of the door, wherein the transport hook is pivoted away from the girt bar when the mechanism is in the armed configuration and oriented to move over the girt bar without contact with the girt bar upon opening of the door, and wherein the girt bar remains in a same girt bar position and girt bar orientation between the armed and disarmed configurations.

2. The mechanism as defined in claim 1, wherein the at least one transport hook includes one hook located adjacent each end of the girt bar.

3. The mechanism as defined in claim 1, wherein the movable portion includes at least one pivotable pawl having a first surface in contact with the girt bar when the mechanism is in the armed configuration and out of contact with the girt bar when the mechanism is in the disarmed configuration, the mechanism further including an engagement member for each pawl, the engagement member extending from the shaft spaced apart from the transport hook and engaging the pawl to pivot the pawl upon rotation of the shaft between the armed and disarmed configurations.

4. The mechanism as defined in claim 3, wherein the first surface of each pawl is an arcuate bottom surface, the pawl including a concave surface adjacent an upper end of the arcuate bottom surface defining a notch receiving the girt bar when the mechanism is in the disarmed configuration.

5. The mechanism as defined in claim 3, wherein the at least one pawl includes one pawl located adjacent each end of the girt bar.

6. The mechanism as defined in claim 3, wherein the engagement member includes a roller supported by members extending radially from the shaft and in contact with a curved surface of each pawl.

7. The mechanism as defined in claim 3, wherein each pawl is biased toward the armed configuration.

8. The mechanism as defined in claim 7, further including an ice breaking assembly including an element adjacent each pawl, connected to the shaft and pivotable with the shaft, the element of the ice breaking assembly moving in proximity of the pawl upon returning to the armed configuration from the disarmed configuration.

9. The mechanism as defined in claim 8, wherein the element moving in proximity of the pawl upon returning to the armed configuration from the disarmed configuration is connected to the shaft through a series of pivotally interconnected members.

10. The mechanism as defined in claim 1, further including a position indicator including a plate connected to the shaft and pivotable with the shaft, the plate received in a casing and aligned with an opening thereof in only one of the armed and disarmed configurations.

11. The mechanism as defined in claim 1, wherein the door opens through an initial upward motion, the free path defined along a top portion of the girt bar.

12. The mechanism as defined in claim 1, wherein the bottom and top portions of the transport hook protrude beyond the girt bar when the mechanism is in the disarmed configuration.

13. A method of arming and disarming an actuation of an emergency slide retained on an aircraft door by operating a mechanism, the mechanism selectively configurable between an armed configuration and a disarmed configuration, the mechanism comprising a girt bar attached to one end of the slide, a floor fitting receiving the girt bar and including a movable portion movable between a first position and a second position corresponding to the armed and disarmed configurations, the movable portion capturing the girt bar to prevent disengagement from the floor fitting when the mechanism is in the armed configuration and defining a free path allowing the girt bar to be removed through said free path when the mechanism is in the disarmed configuration, a shaft attached to the door, rotatable about a longitudinal axis of the shaft, and rotatable between a first orientation and a second orientation corresponding to the armed and disarmed configurations, and at least one transport hook rigidly connected to the shaft, extending radially from the shaft and rotatable with the shaft about the longitudinal axis of the shaft, the transport hook having interconnected top and bottom portions defining a carrying slot between the top and bottom portions, the girt bar remaining in the same girt bar position and girt bar orientation between the armed and disarmed configurations, wherein the method comprises:

rotating the shaft about the longitudinal axis of the shaft;
disarming the mechanism by receiving the girt bar in the carrying slot of the transport hook having the bottom portion extending below the girt bar and the top portion extending above the girt bar such that the transport hook carries the girt bar upon opening of the door; or
arming the mechanism by pivoting and orientating the transport hook away from the girt bar to move the transport hook over the girt bar without contact with the girt bar upon opening of the door.

* * * * *